Feb. 23, 1937.  G. T. BALFE  2,071,322
LAMINATED GASKET
Filed April 18, 1935
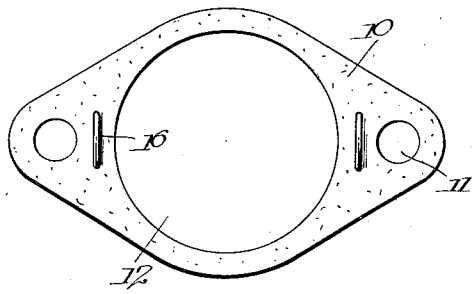
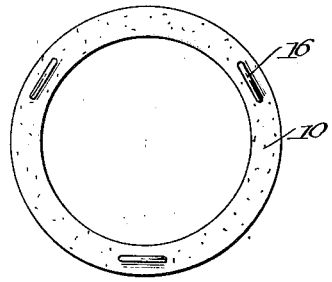
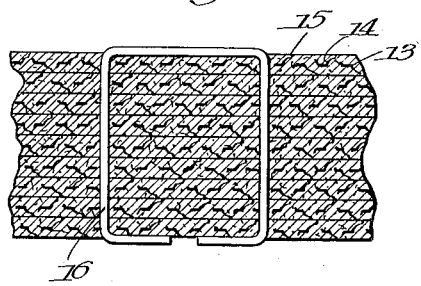
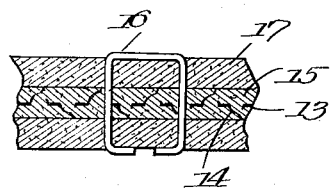
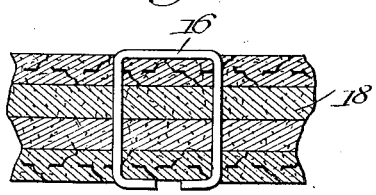
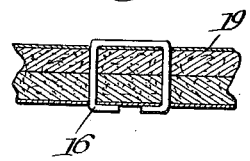
Inventor
George T. Balfe.
By Cushman, Darby, & Cushman
Attorneys Patented Feb. 23, 1937

2,071,322

UNITED STATES PATENT OFFICE 2,071,322

LAMINATED GASKET

George T. Balfe, Detroit, Mich., assignor to Detroit Gasket & Mfg. Company, Detroit, Mich., a corporation of Michigan Application April 18, 1935, Serial No. 17,123

2 Claims. (Cl. 288—1)

My invention relates to a method of manufacturing laminated material particularly useful for gaskets employed in the automotive field. The object of the invention is to provide a cheap, efficient and simply constructed laminated material which may be formed into gaskets useful, for example, in association with the joint between the carburetor and manifold of an internal combustion engine. The construction, however, is equally applicable for sealing joints of all characters and forms an effective and long wearing seal.

A particular feature of the present invention is its simplicity of manufacture whereby a laminated product of any desired thickness to accommodate the space between the joint contact surfaces may be readily built up to within very accurate limits. The laminated construction comprises a plurality of layers of gasket material, preferably metal layers and cushion insulating layers, and these are joined into a substantially integral structure by means of stitching. The best stitching material is metal wire, and the stitches are applied at spaced points, although a continuous stitch may be used.

The laminated structure has the desired resiliency and flexibility and, as stated, is long wearing, i. e., resistant to the influences of heat and cold, moisture, chemical action and all of the varied and rigorous influences encountered in internal combustion engine practice.

Referring to the drawing:

Figures 1 and 2 are elevational views illustrative of forms which the invention may take.

Figure 3 is a partial section of the laminated material.

Figure 4 is a similar section of a modification.

Figure 5 is likewise a similar section of a modification, and

Figure 6 is also a section of a modification.

Referring to Figure 1, I have illustrated a laminated gasket at 10 having bolt openings 11 and the usual port opening 12. This gasket is particularly useful as a carburetor gasket. In Figure 2 I have illustrated as a further form, a ring gasket, and it will be understood, therefore, that the illustrations in Figures 1 and 2 are purely exemplary and the laminated product will take any desired size and shape and thickness.

In Figure 3 I have illustrated a plurality of coextensive gaskets constructed after the manner of my Patent No. 1,776,140, arranged in superposed relation. These preformed gaskets consist of a metal insert layer 13 having up-struck projections 14, on one or both sides thereof, which projections are embedded in a coextensive layer of cushion material 15 disposed on one or both sides of the metal insert layer 13.

A required number of coextensive units or preformed gaskets are built up to form the desired thickness and are then stitched together as shown at 16. Metal stitching is employed which may be continuous but preferably spaced stitches are used, as illustrated. As shown, the exposed portions of the stitches extend slightly above the planes of the surfaces of the gasket. This is somewhat exaggerated, since in the actual gasket, the extent of this projection above the plane of the gasket is negligible and the gasket surfaces present a substantially smooth and continuous surface. If desired, the exposed portions of the stitching may be pressed in and embedded in the surface layers.

In Figure 4 I have shown a layer of gasket material comprising metal insert 13, projections 14 and cushion layers 15, as a core, and upon opposite sides thereof are superposed layers 17 of cushion insulating material devoid of metal. Stitches 16 are likewise applied to this coextensive built-up structure in order to unite the layers together.

In Figure 5 the core comprises a cushion layer or layers 18 devoid of metal and surface layers of metal insert-cushion material 13, 14, 15. The coextensive superposed layers are stitched together by means of metal stitching 16 in a manner heretofore described.

In Figure 6 the gasket comprises any suitable core, preferably of cushion material devoid of metal, but metal insert-cushion material may be used, and the surface layers are of plain metal 19. In some cases the surface layers 19 are formed with struck-up projections, as with the metal layer 13, on one side only, which are embedded in the adjacent layer of cushion insulating material.

It will be understood that the laminated product may have a surface layer of metal on one surface and the opposite surface of cushion insulating material devoid of metal or cushion material having the projections 14 embedded therein.

The metal insert or metal layers 13, 19 may be of steel, copper, aluminum or other suitable material.

The cushion insulating material will comprise asbestos, asbestos composition, rubber, fibre board or cork and fibre layers constructed after the manner of the patents to Schacht, Nos. 1,888,409 and 1,888,410.

The surfaces of the cushion insulating layers will be provided with a resistant coating and non-sticking layer, or simply graphited, all as described in my application Serial No. 648,691, and the cushion insulating material will preferably have incorporated therein or be coated or impregnated with a suitable water, heat and cold, and chemical resistant material as set forth in said application.

In some cases the built-up structure will comprise plain metal layers, and cushion layers devoid of metal or metal insert-cushion layers, stitched together in the manner described.

If desired, the intermediate layers may be adhesively united prior to the stitching operation; any suitable adhesive which is moisture and temperature resistant, as well as resistant to gases and other chemical influences, is useful.

The built-up structures illustrated, are capable of being formed to have a beveled contour as described in my copending application Serial No. 741,024.

While I have illustrated herein metal insert-cushion material layers 13, 14, 15, wherein the cushion layers are placed upon each side of the metal layer, it will be understood that the metal layer 13 will have projections 14 struck-up on one side only and provided with a single coextensive cushion layer 15 in which said projections are embedded as in my United States Patent 1,776,140. A built-up structure having the units of this character is built up and the units stitched together in the manner described with the surface layers constituted by either the plain perforated side of the metal or the cushion layers. If it is desired, of course, one surface of the gasket will comprise the plain perforated metal layer and the opposite surface the cushion material layer. Single cushion layer-metal insert units of this type are likewise used in each of the several modifications shown and described.

In forming the laminated structures of the character before described, I proceed to build up preformed coextensive layers of the contour shown, for example, in Figures 1 and 2 to the desired thickness. These layers of preformed contour are punched from the desired sheet material. Thereafter, the layers are stitched together by metal stitching, preferably at spaced points. In some cases, the intermediate layers will be adhesively united together preliminary to the stitching operation.

I also prepare a laminated structure consisting of coextensive superposed sheets of any desired area and build the same up to the desired thickness, adhesively uniting the intermediate layers if desired. Thereupon the construction is stitched with metal stitching which may be either continuous or at spaced points. This stitching may conform to any desired contour or be so disposed that articles punched from the built-up structure will be similar to those shown in Figures 1 and 2. Again the sheeted built-up structure may have a line of stitching around its periphery and adjacent a port or bolt openings or both which will be punched in the sheet, or the stitching may extend throughout the area of the sheeted built-up structure. This sheeted built-up structure is punched in some cases to form gaskets of the type shown in Figures 1 and 2 after the stitching, or the structure may be punched first and the laminated and formed product then stitched as shown in Figures 1 and 2.

The size and thickness of the laminated material will vary as desired and the composition of the several layers will likewise be selected to meet the particular sealing needs.

This application is a continuation-in-part of my application Serial No. 648,691, filed December 23, 1932.

I claim:

1. A laminated gasket comprising superposed preformed gaskets having a metal layer and coextensive cushion layers united thereto, said gaskets stitched together by metal stitching, at spaced points.

2. A laminated gasket comprising in superposed relation metal layers and cushion layers, the metal layers having upstruck projections embedded in the cushion layers, and layers devoid of metal, said layers stitched together by metal stitching.

GEORGE T. BALFE.